(12) United States Patent
Mainali et al.

(10) Patent No.: US 10,909,074 B2
(45) Date of Patent: Feb. 2, 2021

(54) FILE TABLE INDEX AGGREGATE STATISTICS

(71) Applicant: MICROSOFT TECHNOLOGY LICENSING, LLC, Redmond, WA (US)

(72) Inventors: Shane Kumar Mainali, Duvall, WA (US); Krishnan Varadarajan, Redmond, WA (US); Quan Zhang, Kenmore, WA (US); Jegan Devaraju, Redmond, WA (US); Ziehen Sun, Sammamish, WA (US); Hao Feng, Redmond, WA (US); Ju Wang, Santa Clara, WA (US); Manish Chablani, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 430 days.

(21) Appl. No.: 15/490,741

(22) Filed: Apr. 18, 2017

(65) Prior Publication Data
US 2018/0300350 A1    Oct. 18, 2018

(51) Int. Cl.
*G06F 16/13*   (2019.01)
*G06F 16/901*   (2019.01)

(52) U.S. Cl.
CPC ........ *G06F 16/134* (2019.01); *G06F 16/9027* (2019.01)

(58) Field of Classification Search
CPC ............. G06F 16/134; G06F 17/30094; G06F 17/30194; G06F 16/9027
See application file for complete search history.

(56) References Cited

U.S. PATENT DOCUMENTS 7,039,663 B1 * 5/2006 Federwisch ......... G06F 11/1451
9,218,383 B2   12/2015 Tan et al.
(Continued)

OTHER PUBLICATIONS

Amur, et al., "Memory-Efficient GroupBy-Aggregate using Compressed Buffer Trees", In Proceedings of the 4th annual Symposium on Cloud Computing, Oct. 1, 2013, 16 pages.
(Continued)

*Primary Examiner* — James E Richardson
(74) *Attorney, Agent, or Firm* — Ray Quinney & Nebeker; James Bullough

(57) ABSTRACT

Embodiments provide a method to collect aggregate information or usage data quickly and efficiently with minimal lag. Additionally, the system can use this aggregate information internally for improved load balancing, better data placement, optimization, and enhanced debugging. The system can quickly look at aggregate information across a huge amount of data and drill down cheaply because the aggregate information is generated using existing processes. Aggregated statistics storage and collection may be built on top of an LSM tree used to store a persistent index for a cloud storage system. The statistics may also represent the result of an operation (e.g., max, min, sum, average) on selected parameter(s) or attribute(s) of stored data. Aggregate statistics values may be efficiently maintained during index merge and garbage collection processes or any other index management. As delta LSM trees are merged into a base LSM tree, the aggregates are updated in delta fashion.

20 Claims, 10 Drawing Sheets

(56) References Cited

U.S. PATENT DOCUMENTS

| | | | |
|---|---|---|---|
| 9,286,343 B2* | 3/2016 | Kim | G06F 16/2365 |
| 9,324,367 B1 | 4/2016 | Ku et al. | |
| 10,275,480 B1* | 4/2019 | Evenson | G06F 16/2255 |
| 2011/0093500 A1* | 4/2011 | Meyer | G06F 16/972 |
| | | | 707/774 |
| 2011/0246503 A1* | 10/2011 | Bender | G06F 9/546 |
| | | | 707/769 |
| 2012/0221789 A1 | 8/2012 | Felter | |
| 2013/0332558 A1* | 12/2013 | Condict | G06F 3/0641 |
| | | | 709/214 |
| 2014/0074853 A1* | 3/2014 | Nath | G06F 16/2246 |
| | | | 707/743 |
| 2014/0279855 A1* | 9/2014 | Tan | G06F 16/2228 |
| | | | 707/609 |
| 2016/0055143 A1* | 2/2016 | Goel | G06F 16/93 |
| | | | 715/229 |
| 2016/0306810 A1* | 10/2016 | Ni | G06F 16/182 |
| 2017/0220659 A1* | 8/2017 | Holbrook | G06F 16/27 |
| 2018/0011852 A1* | 1/2018 | Bennett | G06F 16/2272 |
| 2018/0089244 A1* | 3/2018 | Velayudhan Pillai | |
| | | | G06F 16/221 |
| 2018/0225321 A1* | 8/2018 | Boles | G06F 16/9027 |

OTHER PUBLICATIONS

Alsubaiee, et al., "LSM-Based Storage and Indexing: An Old Idea with Timely Benefits", In Proceedings of Second International ACM Workshop on Managing and Mining Enriched Geo-Spatial Data, May 31, 2015, 6 pages.

Myers, et al., "Storage Analytics and Billing", https://docs.microsoft.com/en-us/rest/api/storageservices/fileservices/Storage-Analytics-and-Billing?redirectedfrom=MSDN, Feb. 20, 2017, 2 pages.

Wu, et al., "LSM-trie: An LSM-tree-based Ultra-Large Key-Value Store for Small Data", In Proceedings of the USENIX conference on Usenix Annual Technical Conference, Jul. 8, 2015, 12 pages.

Alsubaiee, et al., "Storage Management in AsterixDB", In Proceedings of the VLDB Endowment, vol. 7, No. 10, Sep. 1, 2014, 12 pages.

* cited by examiner

FILE TABLE INDEX AGGREGATE STATISTICS

BACKGROUND

A distributed storage system can support many different types of applications, such as social network searching, serving video and gaming content, and managing personnel and medical records. The distributed storage system can specifically be implemented with user files, structured storage, and message delivery to support storage and workflow of the applications. Specifically, a distributed storage system can be configured to receive requests to perform transactions that facilitate the storage and workflow of the applications. As such, the capacity of the distributed storage system to handle high volumes of transactions may be critical to the overall performance of the distributed storage system.

Service providers and users often need to collect statistics about the distributed storage system, such as calculating storage account capacity and customer usage. Additionally, service providers and customers often need to query statistics on various characteristic values in their stored data at any level in the distributed storage system. Current storage systems rely on scanning the entire index in response to such queries. This means the entire stored data for the storage service must be read on an ongoing basis for each query. Frequent queries to collect statistics on customer data is very expensive and can impose a very large processing burden on the storage system.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Aggregated statistics storage and collection may be built on top of an LSM (Log Structured Merge) tree used to store a persistent index for a cloud storage system. Aggregate statistics values may be efficiently maintained during index merge and garbage collection processes. As delta LSM trees are merged into a base LSM tree, the aggregates are updated in delta fashion. Efficient queries for aggregates can be performed very quickly over huge sets of data within a partition. Only the left and right sides of a queried key range, which intersect pages for other key ranges, require minor manual computation to compute statistical aggregates. The rest of the query is entirely based on high-level pre-computed aggregates. Each partition can then be further aggregated to compute aggregates over huge amounts of data very quickly with minimal I/O and computation effort.

Embodiments provide a method to collect aggregate information very quickly and efficiently with minimal lag. In one embodiment, minimal lag means that collecting aggregate information does not need to wait for all the aggregated values to be generated on every level of a log structured merge (LSM) tree index. The system can use this aggregate information internally for improved load balancing, better data placement, enhanced debugging, and billing. The system can quickly look at aggregate information across a huge amount of data and drill down cheaply because the aggregate information is generated using existing processes.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail using the accompanying drawings in which.

DETAILED DESCRIPTION

To collect customer billing information in a distributed storage system, a lot of time is required for scanning and counting the billing information from each row belonging to the customer that is stored in the internal file table. Such operations can take days on certain accounts that heavily use or that have a lot of blobs stored. Extra data coming into the storage system during period (days) of billing collection may be missed, thereby causing revenue loss. Moreover, collecting billing information by scanning row by row is very CPU and I/O resource consuming. For example, two concurrent threads are always utilized per table server, which is a significant drain on resources.

Load balance on the file table is not precise in existing storage systems. Current design on getting a split key from the file table is to select the partition key in the index record that posits in the middle of the very top index page. Such imprecise file table split will result in inaccurate load balance.

To solve the above-noted problems, values from each child page pointed by index records are recursively aggregated and persisted in the index pages of the file table. With the aggregated value in the index pages of the file table, aggregating billing information can be reduced from exponential time to polynomial time, and file table can be split more evenly. For example, a billing job aggregates values on total billable size, total row count, and total container count to each account. With the aggregated value in the index pages, the billing job can retrieve the aggregated values just by reading the polynomial number of index pages to the height of the file tables. To get the split key, the storage system can recursively select an index record as the separator if it can equally divide a certain aggregated value, such as total size or total row count, in each level of index pages.

Figure 1:
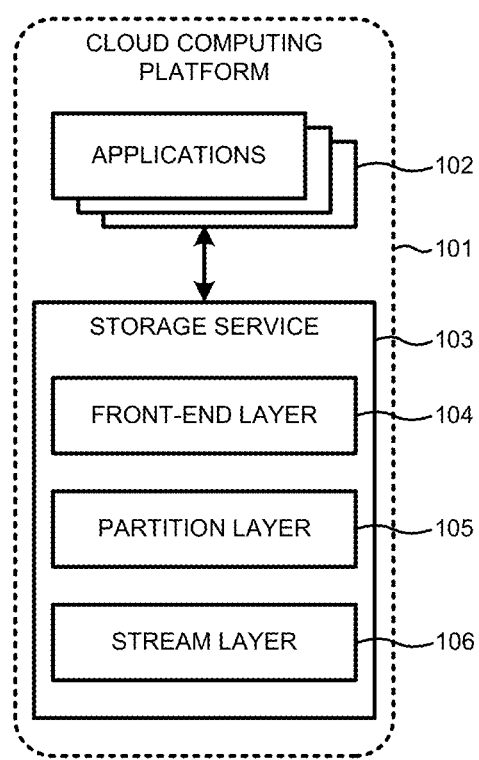
FIG. 1 is a highly-simplified block diagram of a cloud computing platform.

FIG. 1 is a highly-simplified block diagram of a cloud computing platform 101. A plurality of servers, processors, and/or virtual machines in cloud platform 101 host applications 102. A cloud storage service 103 provides the ability to store large amounts of data for use by applications 102. Cloud storage service 103 may be supported by one or more storage stamps, which comprise clusters of multiple racks of storage nodes. Each rack may be built as a separate fault domain with redundant networking and power. In an example embodiment, each storage stamp may hold tens or hundreds of petabytes of raw storage.

Storage stamps provide a higher level of scale out for a cloud computing service. Each storage stamp is a separate scale unit, and stamps are largely independent from one another. Each customer storage account is associated with a specific separate storage stamp. Customers can use separate storage accounts and if needed can spread accounts across storage stamps. Customers may also spread their workload across regions, such as by having accounts in different regions which have separate storage stamps.

Storage service 103 comprises a front-end layer 104, a partition layer 105, and a stream layer 106. Front-end layer 104 may be configured to receive incoming requests from applications 102 or other clients. Upon receiving a request, the front-end layer 104 authenticates and authorizes the request. Front-end layer 104 routes the request to a partition server in the partition layer 105. Front-end layer 104 maintains a partition map that tracks partition name ranges and that identifies which partition server serves which partition names.

Partition layer 105 is responsible for managing and understanding high level abstractions of user data, such as blobs, tables, and queues. Partition layer 105 provides a scalable index, transaction ordering, and storage consistency for objects. Partition layer 105 supports storing object data on top of the stream layer 106. Partition layer 105 provides scalability storage service 103 by partitioning data objects within a storage stamp.

Stream layer 106 functions as a distributed file system layer within a storage stamp. Stream layer 106 stores the actual data bits to disk and supports replicating the data across many servers to keep data durable within a storage stamp. The stream layer 126 supports files called "streams," which are ordered lists of large storage chunks called "extents." The stream layer stores and replicates extents. User data is stored in the stream layer 106 and is accessible from the partition layer 105. Stream layer 106 provides an internal interface (API) used by partition layer 105 to perform writes, which may be append-only. Stream layer 106 allows the partition layer 105 to open, close, delete, rename, read, append to, and concatenate these stream files.

A partition is a collection of streams. Each partition has a unique name. The streams are prefixed with the partition name so that all streams have unique names. The streams are independent of each other at the stream layer so that they get their own extents (data) and metadata in the stream layer. Partitions read and write only with their streams, which allows the partitions to be completely independent.

Figure 2:
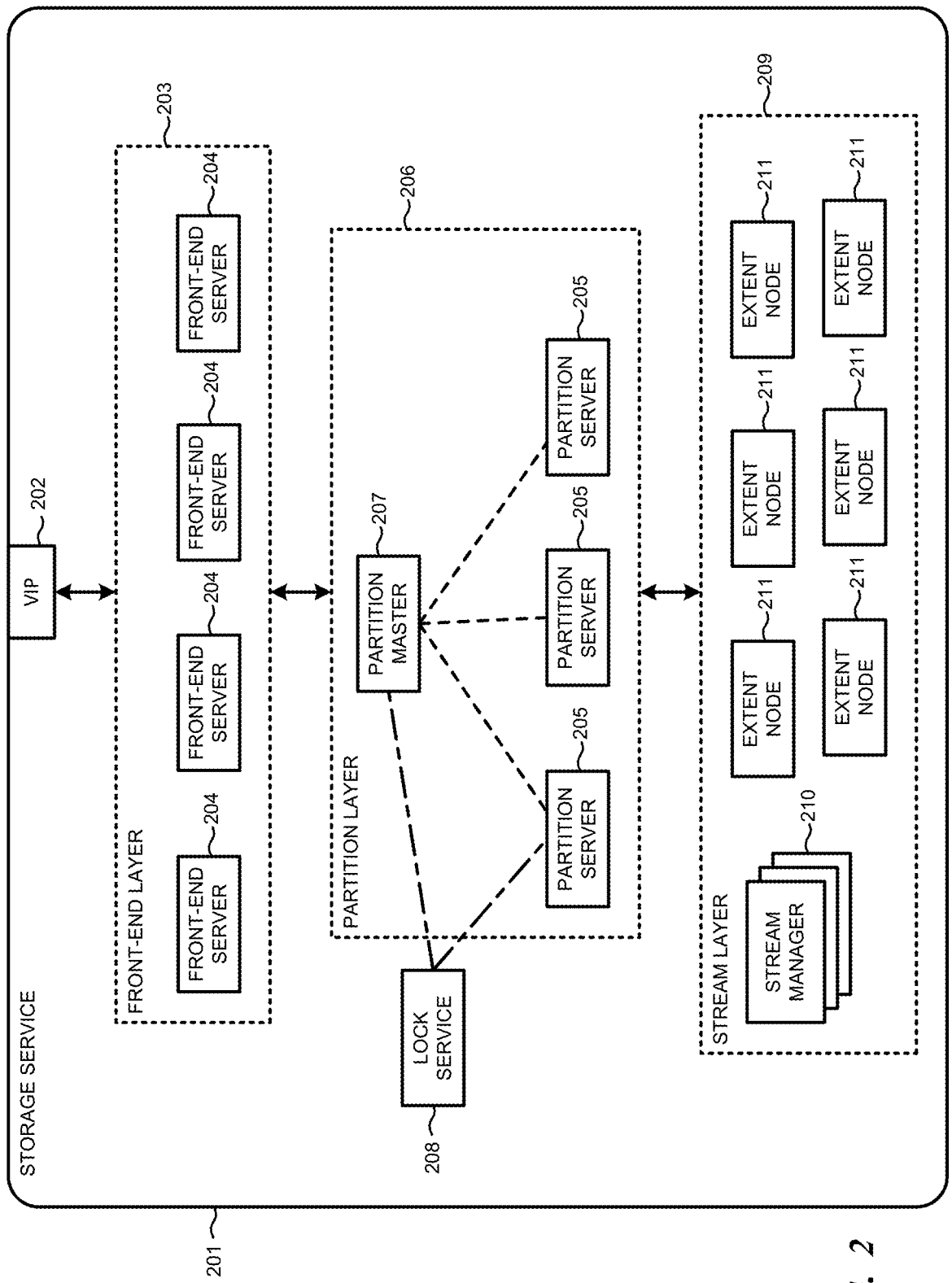
FIG. 2 is block diagram illustrating the components of a storage service according to one embodiment.

FIG. 2 is block diagram illustrating the components of a storage service 201 according to one embodiment. Applications and clients communicate with storage service 201 through a virtual IP (VIP) address 202, which is an IP address the storage service exposes for external traffic. Front-end layer 203 comprises a plurality of front-end servers 204. Incoming requests to storage service 201 are routed from VIP 202 to one of the front-end servers 204, which are stateless servers that provide authentication and authorization for incoming requests. Front-end servers 204 route requests to a selected partition server 205 in partition layer 206 using a partition map. When a user creates a new account or requests additional storage for an existing account, the user is assigned to a storage service or storage stamp. Account metadata information is stored in the assigned storage stamp, which tells the storage service to start accepting traffic for the assigned account. The cloud service's DNS is updated to allow requests to route from the user's assigned URL (e.g., https://AccountName.service.net/) to the assigned storage stamp's VIP address.

Partition layer 206 comprises a plurality of partition servers 205. Stored data in storage service 201 is divided across a plurality of partitions. For example, storage service 201 may comprise a key space divided among the plurality of partitions. Partition master 207 is configured to assign these partitions to partition servers 205. Partition master 202 is further configured to control load balancing of the partitions on partition servers 205. Additionally, partition master 207 is configured to monitor resource utilization with respect to any of the partitions and/or partition servers 205 and to support integrated resource allocation. If a partition server fails, partition master 207 reassigns all partitions served to the failed partition server to available partition servers 205. When a partition is assigned to a new partition server 205, then partition manager 207 updates the partition map to specify which partition server 205 is responsible for each partition. Lock service 208 is used for leader election of the partition master 207. Lock service 208 also maintains leases with each partition server 205 to serve partitions.

Stream layer 209 is an append-only distributed file system. The two main architecture components of the stream layer 209 are the stream manager 210 and the extent nodes 211. The stream manager 210 keeps track of the stream namespace, what extents are in each stream, and the extent allocation across the extent nodes 211. Stream manager 210 may be a standard Paxos cluster that is off the critical path of client requests. Stream manager 210 maintains the stream namespace and the state of all active streams and extents, monitors the health of the extent nodes 211, creates and assigns extents to extent nodes 211. Stream manager 210 performs the lazy re-replication of extent replicas that are lost due to hardware failures or unavailability, performs garbage collection on extents that are no longer pointed to by any stream, and schedules the erasure coding of extent data according to stream policy.

Stream manager 210 periodically polls the state of the extent nodes 211 and what extents they store. If an extent is replicated on fewer than the expected number of extent nodes 211, a re-replication of the extent will lazily be created by the stream manager 210 to regain the desired level of replication. The stream and extent state is only tracked within a single stamp, the amount of state can be kept small enough to fit in the SM's memory. The only client of the stream layer 209 is the partition layer 206. All data from the partition layer 209 is stored into files or "extents" on extend nodes 211 in stream layer 209. Each extent is replicated three times across extent nodes 210 with different fault and upgrade domains.

Each extent node 211 maintains the storage for a set of extent replicas assigned to it by the stream manager 210. An extent node 211 has a plurality of disks attached, which it completely controls for storing extent replicas and their blocks. The extent node 211 knows nothing about streams, and only deals with extents and blocks. Internally on an extent node 211, every extent on disk is a file, which holds data blocks and their checksums, and an index which maps extent offsets to blocks and their file location. Each extent node 211 contains a view about the extents it owns and where the peer replicas are for a given extent. When an extent is no longer referenced by any stream, the stream manager 210 garbage collects the extent and notifies the extent node 211 to reclaim the space.

Figure 3:
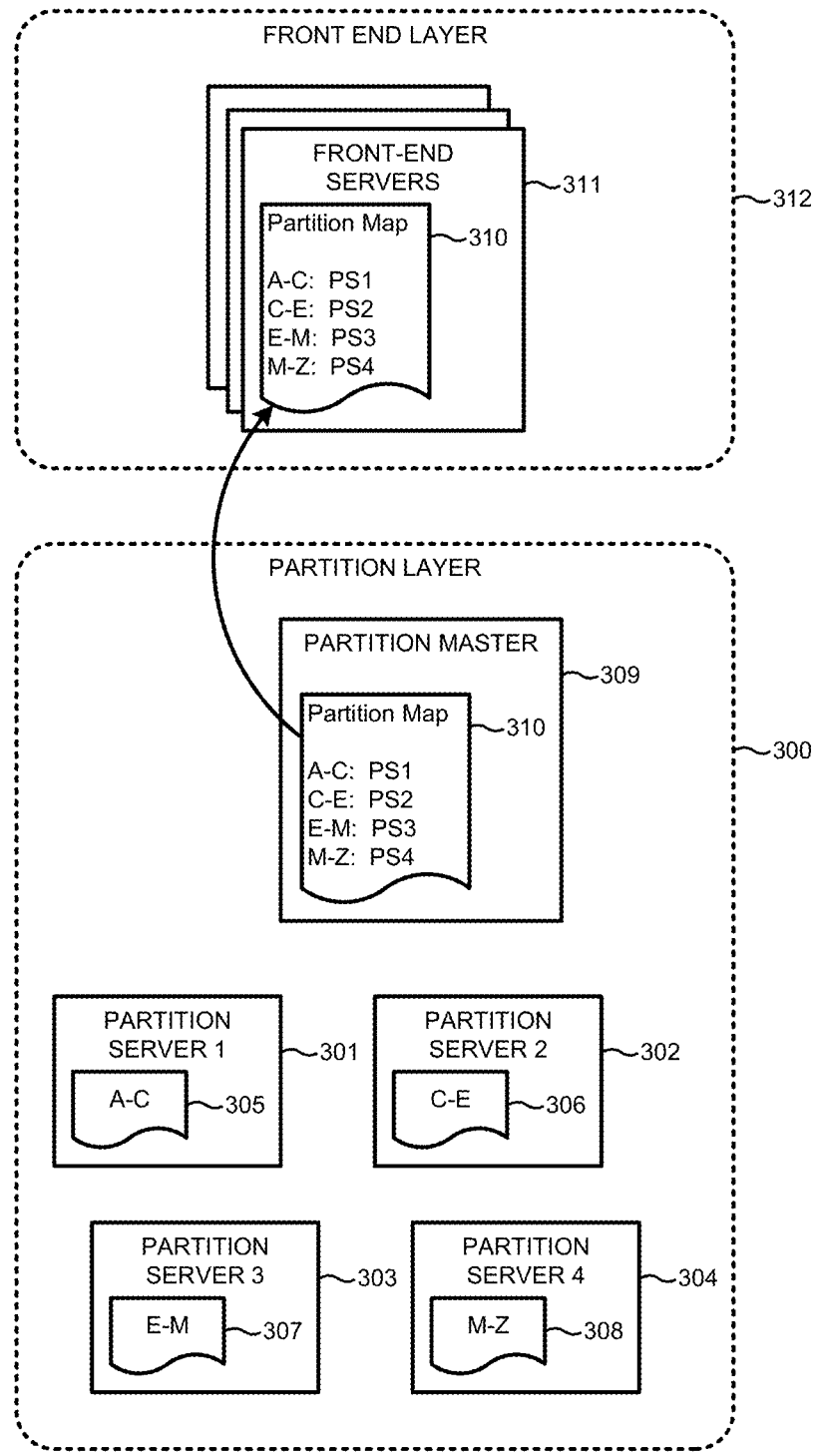
FIG. 3 illustrates index range partitioning in the partition layer according to one embodiment.

FIG. 3 illustrates index range partitioning in the partition layer 300 according to one embodiment. Each partition server 301-304 is assigned a partition range 305-308 by partition master 309 based upon load. The partitions 305-308 are split at partition key boundaries. Partition master 309 maintains a partition map 310 that tracks index range partition assignments across the partition servers 301-304. The partition map 310 keeps track of the current range partitions for all object tables and what partition server is serving each range partition. A range partition is a contiguous range of rows in the partition map 310 from a given low-key to a high-key. For example, in one embodiment, key ranges may be [Key Low, Key High) where "[Key Low" means key low is inclusive and "Key High)" means key high is exclusive. The Key High of one partition will match the Key Low of the next partition. All range partitions for the partition map 310 are non-overlapping, and every row is represented in some range partition. Each part of the index is assigned to only one partition server 301-304 at a time. The partition map 310 is cached to the front-end servers 311 in front-end layer 312. The partition map 310 is used by the front-end servers 311 to route requests to the corresponding partition servers 301-304.

Figure 4:
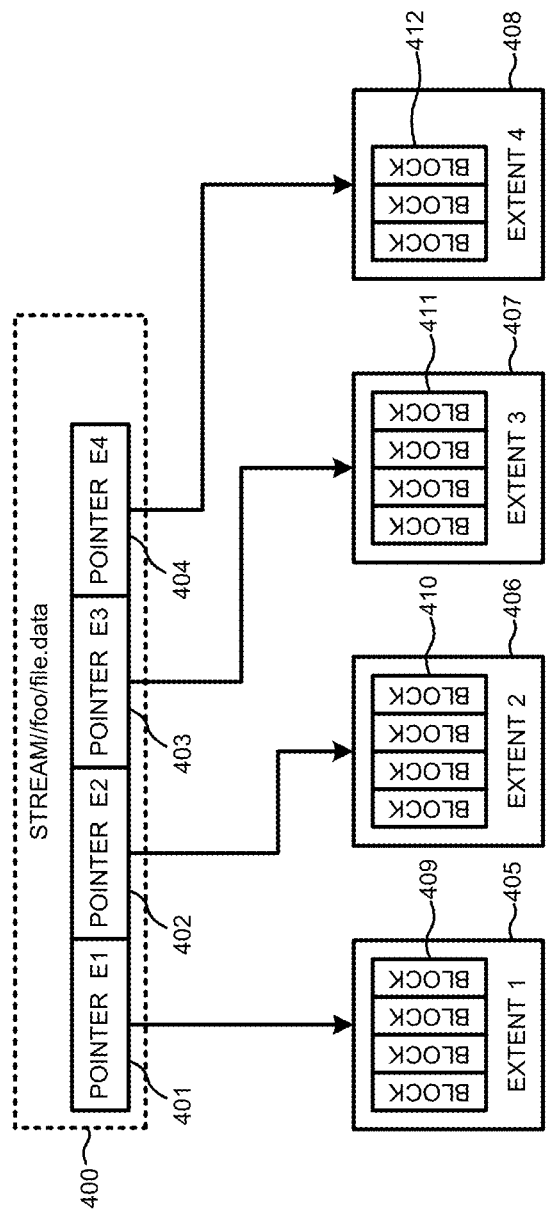
FIG. 4 illustrates an example stream "//foo/file.data".

FIG. 4 illustrates an example stream "///foo/file.data" 400 that contains pointers 401-404 to four extents 405-408. A stream is an ordered list of extent pointers, and an extent is a sequence of append blocks. Each extent 405-408 contains a set of blocks 409-412 that were appended to it. Extents 405-407 are sealed extents, which means that no additional blocks can be appended to these extents. Only the last extent 408 in the stream can be can have additional blocks appended. If an application read the data of stream 400 from beginning to end, it would get the block contents 409-412 of the extents 405-408 in order. Every stream has a name in the hierarchical namespace maintained at the stream layer. The stream looks like a large file to the partition layer. Streams are appended to and can be read from randomly. A new stream can be constructed by concatenating extents from existing streams, which is a fast operation since it just updates a list of pointers.

A block 409-412 is minimum unit of data for writing and reading in the storage system. A block can be up to a specified number of bytes (e.g. 4 MB). Data is written by appending one or more concatenated blocks to an extent 405-408. The blocks do not have to be the same size. A client read gives an offset to a stream or extent, and the stream layer reads as many blocks as needed at the offset to fulfill the length of the read. When performing a read, the entire contents of a block are read.

Extents 405-408 are the unit of replication in the stream layer. In one embodiment, the default replication policy is to keep three replicas within a storage service for an extent. Each extent 405-408 is stored as a sequence of blocks 409-412. To store small objects, the partition layer appends many of the small objects to the same extent and even in the same block. To store large (e.g., terabyte-sized objects or Blobs), the object is broken up over many extents by the partition layer. The partition layer keeps track of what streams, extents, and byte offsets in the extents in which objects are stored as part of its index. When the extents 405-408 are concatenated together, they represent the full contiguous address space in which the stream 400 can be read in the order they were added to the stream 400.

The partition servers 301-304 and partition master 309 (FIG. 3) may also function as table servers and table master that create and maintain a file table index of the data stored to the storage service. The table master has a dictator-type role, which is a separate role from table servers, and manages all partitions, including load balancing them. Every N seconds, the table master heartbeats with every partition. The partition heartbeat includes, for example, load information (transactions per second (TPS), bandwidth, throttling, timeouts, request type breakdown), size, capacity, garbage information, geographic replication information, etc.

The table servers may create a number of tables, such as system tables, data object tables, and internal tables. Each table has a specific schema that lists the columns that the rows in a table can have as well as the partition key and row key columns. Column information contains the name, type, default value, etc. for each column. Partition key defines how to shard or partition the data. Row Key defines the composite sort order, where partition key is a logical prefix of row key. System tables include a "tables" table with table names and their schemas, and a "partitions" table with a full list of partitions in the storage service. Data object tables include account, blob container, table container, queue container, file container, blob object, utility row, message object, and file tables. Internal tables are used for billing/metering, logging/analytics, garbage collection, etc.

Tables are a collection of partitions, wherein each table's schema defines a partition key that tells how to partition/shard the data. A partition owns a distinct key range: [Key Low, Key High). Each partition can be served by a different table server since partitions are completely independent from one another. A table server serves multiple partitions, but those partitions are typically not for the same table.

Figure 5A:
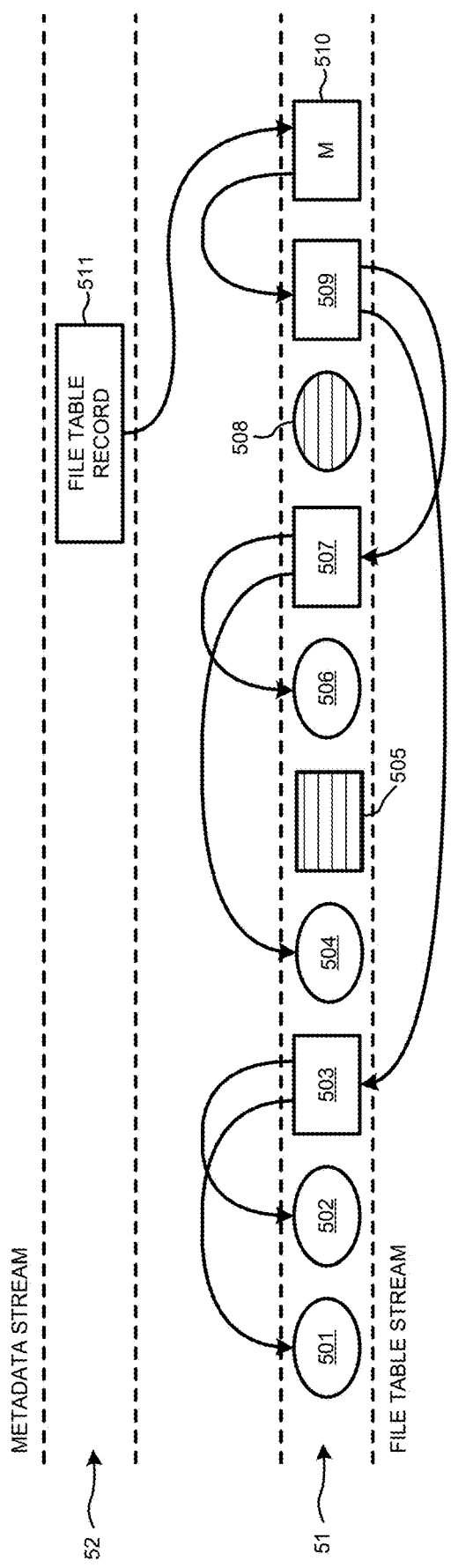
FIG. 5A illustrates a file table, which in one embodiment, may be a B+ Tree or a LSM tree.

FIG. 5A illustrates data written to file table stream 51 and metadata stream 52. For each partition, critical metadata is contained in a metadata stream 52. This metadata includes the list of all stream names for streams that the partition owns, the key range, schema, and pointers to the index and other data stored in streams. The table servers use this metadata to help load partitions. File table record 511 points to the location of meta page 510 in file table stream 51. Meta page 510 points to index page 509, which in turn points to index pages 503 and 507. Those index pages point to leaf pages 501, 502, 504, and 506 in the file table stream. File table stream 51 may also comprise additional leaf data pages 508 and index pages 505 for file tables associated with other partitions of the same object type.

Figure 5B:
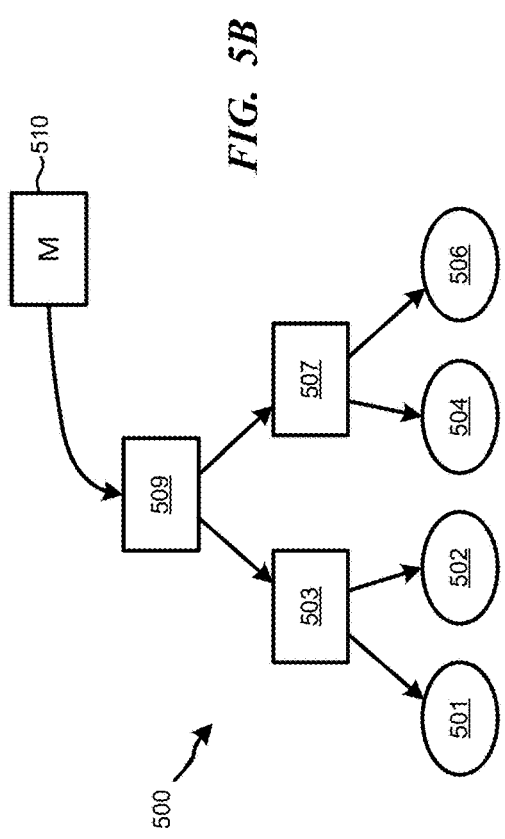
FIG. 5B illustrates how the file tree pages correspond to metadata stream and file table stream.

FIG. 5B illustrates a file table 500 that corresponds to the data and index pages written to file stream 51 (FIG. 5A). File table 500 may be a B+ Tree or a Log Structured Merge (LSM) tree, for example. File table 500 provides a long-term index for data within each partition. The nodes in file table 500 correspond to the page order written to file table stream 51 in FIG. 5A. Meta page 510 is the starting point for accessing file table 500. Meta page 510 contains a pointer to root index page 509, which is the top of the tree 500. Meta page 510 may have other metadata as well. Index pages 503 and 507 are non-leaf pages that are used to navigate to the bottom of file tree 500. Index pages 501, 502, 504, and 506 contain only keys and pointers to child pages. Data pages or leaf pages 501, 502, 504, and 506 contain row data in sorted order. File table pages 501-504, 506, 507, and 509 are immutable. Each file table page is written in one schema version so file table pages can be individually interpreted and schema upgraded.

Figure 6:
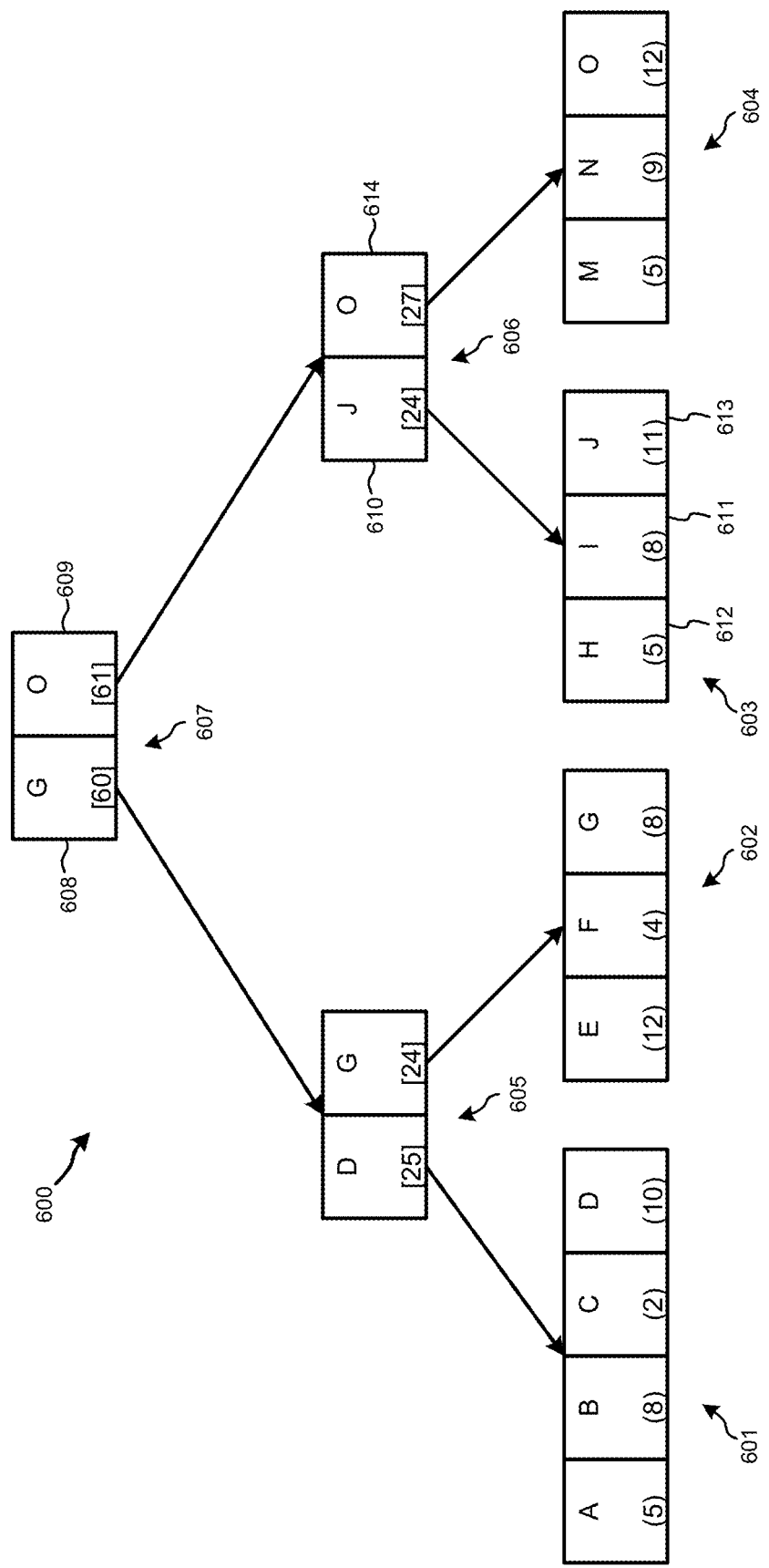
FIG. 6 illustrates a simplified file table according to an example embodiment.

FIG. 6 illustrates a simplified file table 600 according to an example embodiment. The storage service may create file table 600 with leaf pages 601-604. Each leaf page 601-604 comprises a group of keys A-O and associated data. Parent pages 605, 606 point to child leaf pages 601-604. The parent pages 605, 606 comprise a group of keys labeled with the highest key value for each of the parent page's respective child pages. In the simplified example of FIG. 6, leaf page 601 comprises data for keys A-D and leaf page 602 comprises data for keys E-G. Parent index page 605 comprises pointers to leaf pages 601 and 602, which are identified by the highest keys "D" and "G" on those leaf pages. Similarly, leaf page 603 comprises data for keys H-J and leaf page 604 comprises data for keys M-O. Parent index page 606 comprises pointers to leaf pages 603 and 604, which are identified by the highest keys "J" and "O" on those leaf pages. Parent index page 607 points to index pages 605 and 606, which are identified by the highest keys "G" and "O" on those leaf pages.

The file table 600 can be used to find the data with key "I", for example. Starting at main index page 607, key 608 "G" is a pointer to keys in the range A-G, which does not contain "I". Instead, "I" is within the range of key 609 "O." Key 609 points to index page 606 with keys in the range H-O. "I" is within the range of key 610 "J." Key 610 points to leaf page 603, which comprises key "I" 611 and associated data.

Each partition stores a particular type of object, such a blobs, tables, or queues. File table 600 may be used to index keys for any object type. File table 600 may have any number of horizontal leaf pages. The number of leaf pages may vary based upon the number of users, the amount of stored data, and the key range used. For example, a typical storage service may have tens or hundreds of thousands of users storing a total of terabytes or petabytes of data. As more data and keys are added to a partition, additional leaf pages are added to the index. File table 600 may also have any number of vertical parent-child page levels. The number of parent-child levels may vary based upon user configuration and/or the number of keys that can be stored in each index page.

Typically, customers are billed at least in part based upon the amount of storage space used. Currently, to determine how much space is being used by all customers or a particular customer, a background job is run to inspect each relevant key in each leaf page 601-604 to collect the space-usage information. For example, to calculate how much storage a particular user is consuming, the storage service must inspect every key range assigned to that user across all partitions assigned to that user. When expanded to all users, this requires a lot of processing time and expense because all keys in the leaf pages of storage service's indices must be touched.

In addition to providing a key index to stored data, file table 600 may also be used to collect and aggregate statistics about the stored data. By including aggregated statistics in the file table 600, the storage service can quickly calculate usage information or other data. The statistics for each key value may include, for example, the amount of storage space used, the number of rows in a table, the number of blobs, or any other parameter(s) or attribute(s) of interest to the storage service provider or the user. The statistics may also represent the result of an operation (e.g., max, min, sum, average) on selected parameter(s) or attribute(s) for keys in the leaf pages.

As illustrated in FIG. 6, each entry for keys in leaf pages 601-604 include statistics for that key shown in parentheses. These statistics may be, for example, the number of rows in a table or the average number of rows for multiple tables stored at that key. Alternatively, the statistics may represent the highest value entry or an average entry for that key. In leaf page 603, keys H-I have statistics "5," "8," and "11." It will be understood that the present example uses relatively small numbers for simplification and that the statistics stored in a file table may be of any size or format.

As further illustrated in FIG. 6, each entry in parent pages 605-607 includes aggregated statistics for its child page shown in square brackets. For example, the aggregate statistics for leaf page 603 is 24, which is shown in square brackets in key 610 of parent page 606. Key 614 shows 27 in square brackets, which is the aggregate statistics for leaf page 604. Moving further up the file table, key 609 shows 61 in square brackets, which represents the aggregate statistics for index page 606 and, in turn, leaf pages 603, 604.

Accordingly, to determine the aggregate statistics for keys H-O, the storage service only needs to look at key 609. This saves the time and processing power that would have been required in existing systems to query each key in leaf pages 603, 604 to collect this aggregate statistical information.

Figure 7A:
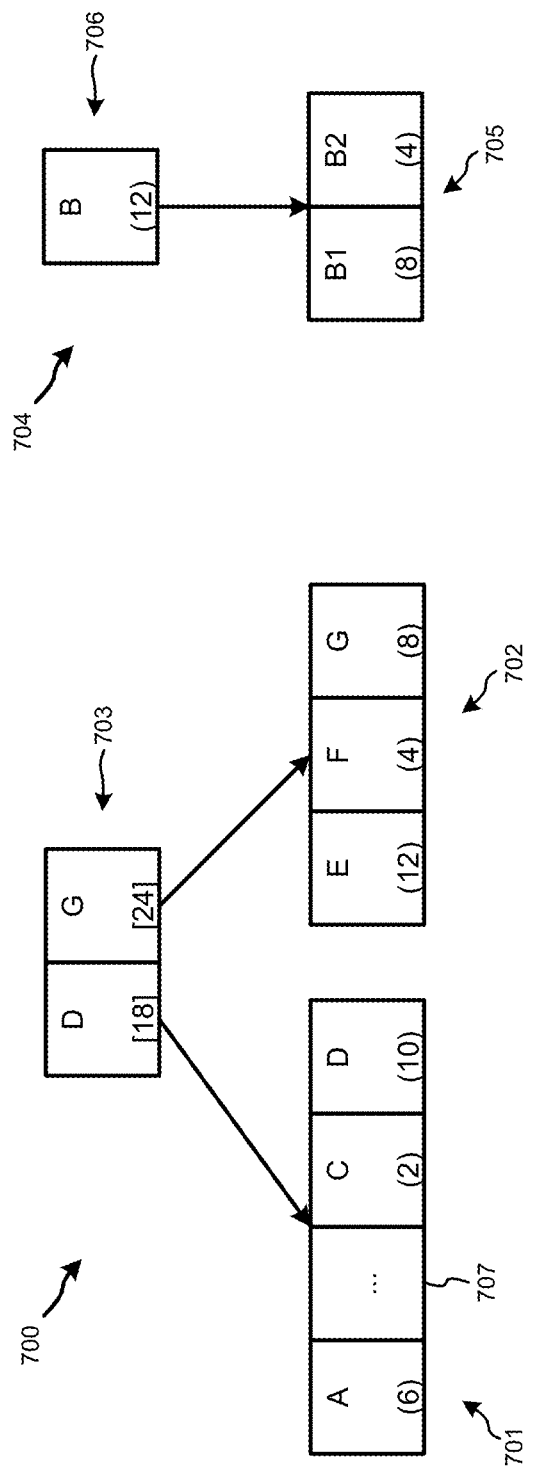
FIG. 7A is a base file table that has been created to index key range A-G.
Figure 7B:
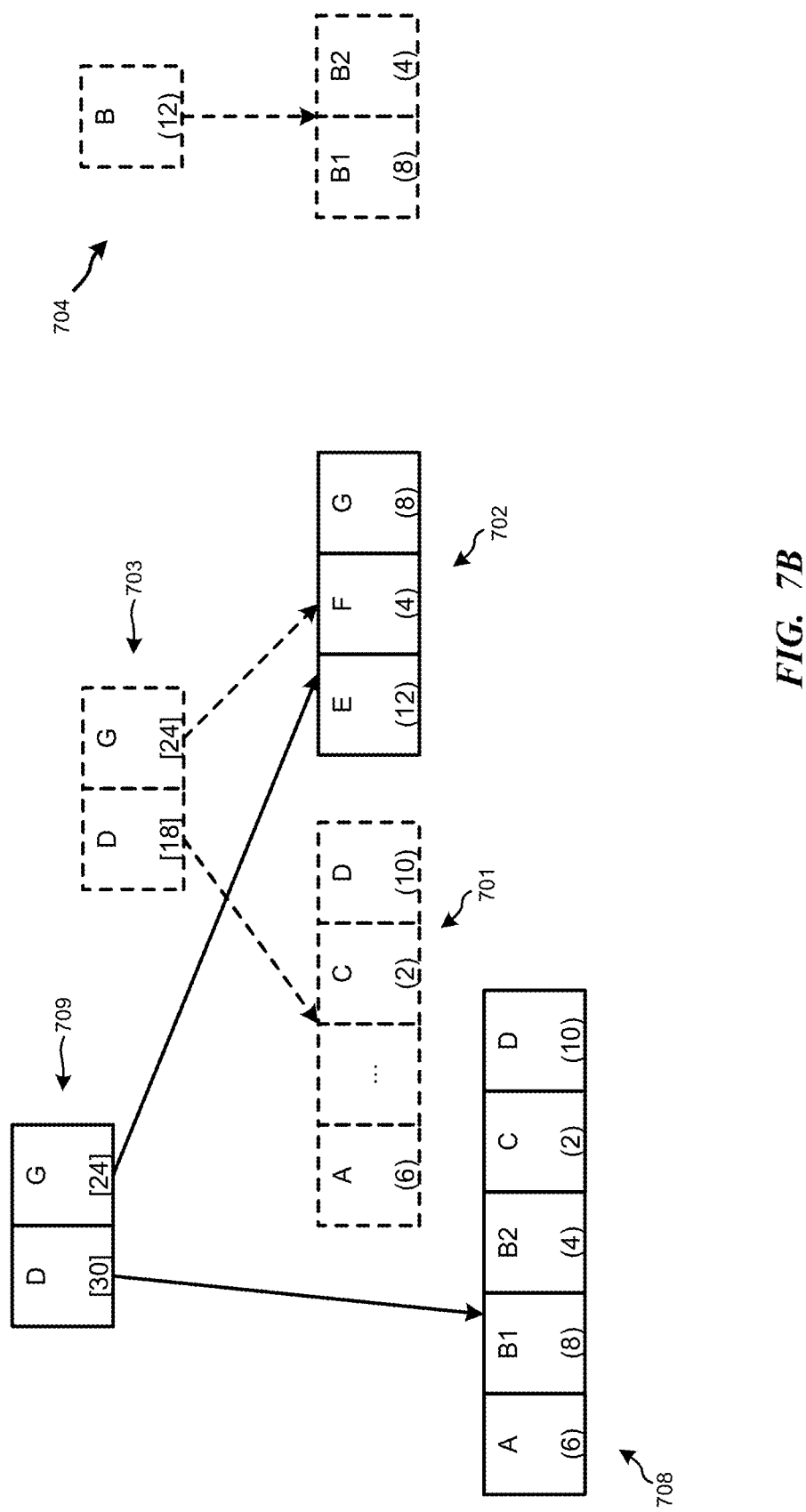
FIG. 7B illustrates a new leaf page created with keys B1, B2 in sequence with the other keys A, C, D.

FIGS. 7A and 7B illustrate how new file tables are created and how existing file tables are merged. In FIG. 7A, a base file table 700 has been created to index key range A-G. Key range B has not yet been used and is not included in table 700. Leaf pages 701 and 702 are for keys A-D and E-G, respectively. Parent index page 703 comprises pointers to leaf pages 701 and 702 and stores aggregate statistics for the leaf pages as discussed above. It will be understood that base file table 700 is merely representative for purposes of illustration and that base table 700 may be part of a larger file table with additional parent pages above page 703.

When the storage service writes data to key range B, a new file table 704 is created. This is referred to as a "delta" table. The delta file table 704 comprises leaf page 705 with keys B1 and B2. Leaf page 705 also includes statistics for keys B1 and B2 and those statistics are aggregated in parent page 706, which points to leaf page 705. As the storage system writes new data to disk, there can and will be multiple file tables. The original file table 700 and the new delta file table 704 may be merged.

After the data has been written to key range B and delta file table 704 is created, the storage service may consolidate the entries from both tables by writing keys B1 and B2 to space 707 in leaf page 701. File table merge is the process of merging two or more file tables into one file table. Because file table pages are immutable, any file table page that must be modified requires writing a new page. Also, because file tables are immutable, any file table merge results in a new meta page that points to the new merged file table.

As shown in FIG. 7B, new leaf page 708 is created with keys B1, B2 in sequence with the other keys A, C, D. Because the leaf page with range A-D has changed and leaf page 701 is no longer accurate, parent page 703 is no used in the index. Instead, new parent page 709 is created with new pointers to the leaf pages 708 and 702 for keys D and G. The original pointer for key D in parent page 703 included aggregate statistic value "18." After key range B1, B2 is added to the keys in leaf 708, the pointer for key D in parent page 709 is updated to hold the aggregate statistic value "30."

A garbage collection process in the storage service may then remove unused index pages 701 and 703 and delta table 704. For example, the index pages may be stored as extents or blocks in extents. After new extents are created for new index pages 708 and 709, the extents associated with old index pages 701 and 703 and with delta file table 704 are no longer needed.

Figure 8:
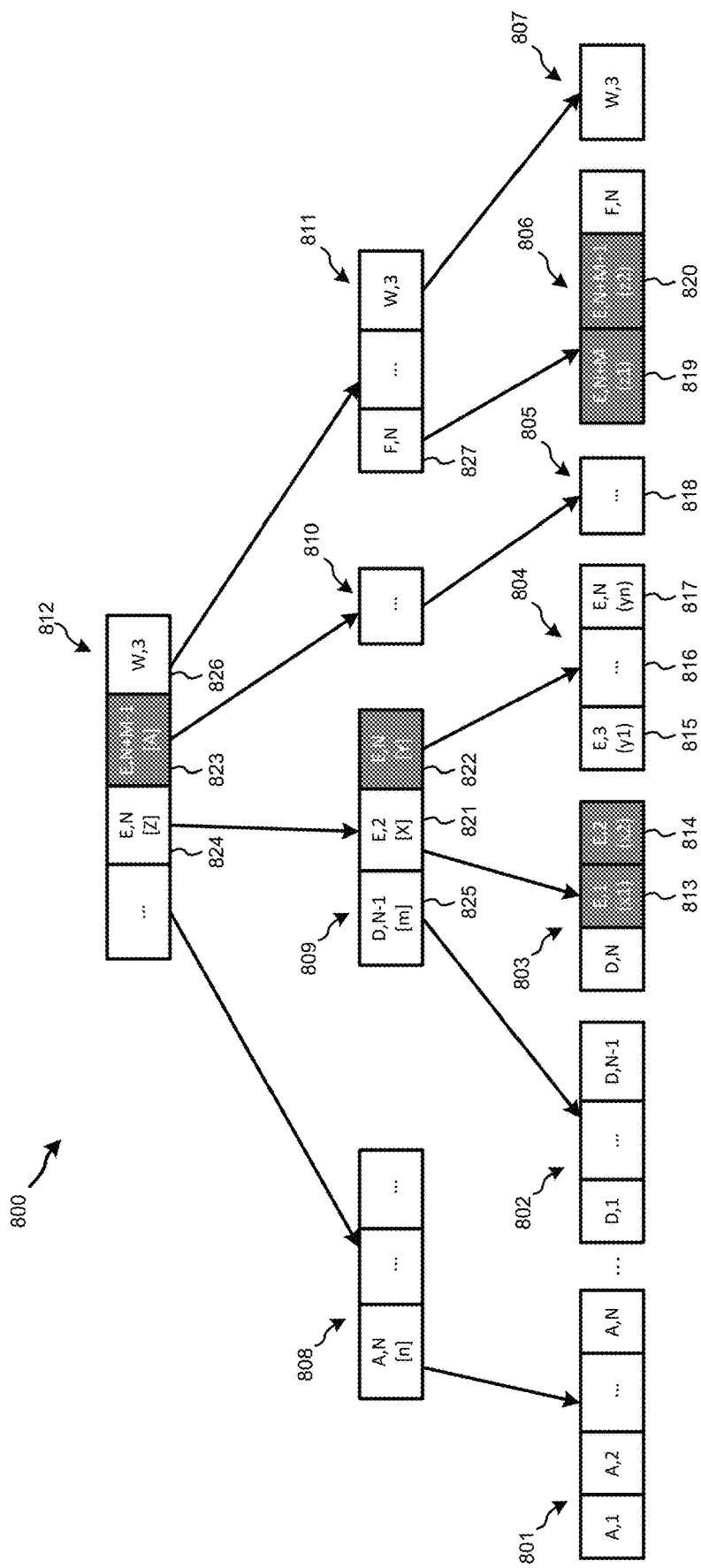
FIG. 8 is an example file table illustrating the benefits of aggregating statistics in parent pages.

FIG. 8 is an example file table 800 illustrating the benefits of aggregating statistics in parent pages. File table 800 indexes a key range from A to W,3. File table 800 has leaf data pages 801-807. Statistics for the key values in the leaf pages 801-807 are represented by a value in parentheses. Parent index pages 808-811 comprise keys pointing to leaf pages 801-807. Aggregated statistics for the key values in each leaf page 801-807 are represented by a value in square brackets for each key in the parent index pages. Root page 812 comprises keys pointing to index pages 808-811. Aggregated statistics for the key values in parent index pages 808-811 are represented by a value in square brackets for each key in the root index page 812. The statistics may be related to any parameter associated with the stored data in the leaf pages, such as object size, space used or available, rows, key counts, etc. Alternatively, the statistics may represent operations (e.g., max, min, sum, average, etc.) performed on parameters associated with the stored data. The statistics may be defined by the storage service provider or by the user.

Because the statistics are aggregated to higher levels in the file table, information about the stored data can be collected quickly. Without such aggregation, each individual key value in leaf pages 801-807 would have to be touched to collect the data. Statistics for the leaf pages 801-807 are aggregated as statistics in non-leaf pages 808-811. Similarly, aggregated statistics for non-leaf pages 808-811 are further aggregated in root page 812. When the storage service is collecting statistics information for a certain key range (e.g., key range "E" in FIG. 8), the storage system does not need to look below a particular non-leaf index page if that index page includes aggregated statistics only for keys within the range of interest. For example, the storage system does not need to look at statistics in page 804 since those statistics have been aggregated in key 822 of page 809.

For example, if a storage service provider wants to determine how much space a customer is using, it can do so quickly with the aggregated statistics even if may customers are served in the same partition. Referring to FIG. 8, the service provider may need to collect statistics for key range E. Leaf pages 803-806 each include data in key range E across keys 813-820. Leaf pages 803 and 806 include keys and statistics in ranges D and F, respectively, in addition to key range E. However, keys 815-818 in leaf pages 804 and 805 comprise data and statistics only for key range E.

Parent index page 809 includes keys and aggregated statistics for both key ranges D and E. Key 821 points to leaf page 803, which includes data and statistics for both key ranges D and E. However, key 822 points to leaf page 804, which includes data and statistics only for both key range E. Accordingly, the aggregated statistics "Y" in key 822 comprise an aggregation of all the key range E statistics in leaf 804 and no other key ranges.

Leaf page(s) 805 comprises the key range E,N+1 to E,N+M−1. Parent index page(s) 810 points to leaf page(s) 804, which includes data and statistics only for both key range E. Furthermore, key 823 in root index page 812 points to leaf page(s) 810, which includes data and statistics only for both key range E. Accordingly, the aggregated statistics "A" in key 823 comprise an aggregation of all the key range E statistics in leaf page(s) 818 and no other key ranges. To collect statistics for key range E, a statistics collection function on the storage service reads from left to right and top to bottom starting with root index page 812. The statistics collection function only reads below the root index page 812 (or below one of the parent index pages 808-811) if a key in the current page includes a key range other than E.

Starting with root index 812, key 824 includes the end of the D key range and the beginning of the E key range, so the statistics collection function drops down to index page 809 to read statistics. Key 825 is for key range D and, therefore, can be ignored. Key 821 includes both the D key range and the E key range, so the statistics collection function drops down to leaf page 803 to read statistics (x1, x2) from keys 813 and 814.

The statistics collection function then returns to index page 809 and key 822, which comprises aggregated statistics only for key range E. Therefore, the statistics collection function can read the aggregated statistics (Y) from key 822 without having to spend the time or processing power to read statistics from each key 815-817 in leaf page 804.

The statistics collection function then moves to root page 812 and key 823, which comprises aggregated statistics only for key range E. Therefore, the statistics collection function can read the aggregated statistics (Y) from key 823 without having to spend the time or processing power required to read statistics from each index page 810 or keys 818 in leaf page 805.

The statistics collection function then moves to root page 812 and key 826, which includes key ranges E through W,3. so the statistics collection function drops down to index page 811 to read statistics. Key 827 includes the key range E,N+M through F,N, so the statistics collection function drops down to leaf page 806 to read statistics (z1, z2) from keys 819 and 820. At that point, there are no more keys in key range E and, therefore, statistics collection function has collected all of the relevant statistics (x1, x2, Y, A, z1, z2). Because aggregate values were available, the statistics collection function did not have to touch index page 810 or leaf pages 804 and 805, which has the potential to save significant time and processing power compared to existing methods which would require the query to touch each key 813-820. If the aggregated value belonging to a certain index record is unknown, the statistics collection function will go down one or more levels until it finds a usable aggregate value.

When querying aggregate values, a timestamp may be added so that the storage system can know how fresh the file tables are. This may be used to tell the client how old the data in the base file table is since the aggregate values are only in the base file table.

In some embodiments, the aggregates are not needed at every index page level in the file index tree. Instead, for example, aggregates may be stored only in the top two levels in a tree with three index levels, which can be generalized to only the top N-M levels of index pages, where M is configurable. This allows the users and storage service provider to add statistics with bigger size requirements without impacting the index efficiency too much.

The aggregated values are persisted in the index pages of the file table, more precisely, in each of the index records in each and every index page of the file table. It is simpler to index the aggregated values by using the existing index keys without changing the file table index page format. Also, it is simpler to perform aggregated values fill-in and incremental update using the existing file table garbage collection and merge logic.

By storing the aggregate values in this way, the storage system uses more space to store the statistical values. Hence the storage efficiency will be reduced. Additionally, efficiency on the index of the file table may be reduced. Because there are more index records to index the same amount of data—assuming the size of each index page is unchanged—the system will spend more time on iterating the data in the file table. However, this trade-off is typically acceptable because the amount of CPU cycles and I/O bandwidth saved by using aggregates is much more valuable than reading extra pages as a result of a slightly lower indexing efficiency. Aggregated statistics do not need to be stored in every index page, but can be stored in upper-level index pages selectively in order to save space.

In some embodiments, the aggregated values are persisted only in the main base file table because the system cannot union the aggregated value on a certain data range from different file tables. The aggregated values in the base file table will not be too stale because file table merge is designed to merge all the updates to the one single file table quickly. However, the storage system may also persist the aggregated value in the large delta file tables in order to make the file table split more precisely. In other embodiments, the staleness may be configurable. The staleness of aggregates has a trade-off with write amplification from file table merge. If the file tables are merged more quickly, then there is more write amplification but less lag with aggregates. If the file tables are merged less quickly, then there is less write amplification but more lag with aggregates. Typical use cases of aggregates are shown to be acceptable with hours of lag and, therefore, write amplification is not impacted much at all. But other embodiments of the system are capable of trading off with merge configuration parameters.

Table 1 is the format of an index page used to persist the aggregated values, according to one embodiment.

TABLE 1

| Fixed header | Page type | 2 bytes |
| --- | --- | --- |
| | Fixed header version | 2 bytes |
| | Index page format version | 4 bytes |
| | Aggregated values format version | 2 bytes |
| | Header length | 4 bytes |
| | Page size | 4 bytes |
| Index page header | Index record count | 4 bytes |
| N Index row key | | |
| N Extent Id | | |
| N Offset | | |
| N Page Size | | |
| N Aggregated values set | | N * length of aggregated values set bytes |

N is the number of index records in the index page. Initially, the aggregated values may have row count, row size and billable size.

To make adding and removing of the aggregated values more flexible, the aggregated values format version may be added in the index page header. This represents the current schema version of the aggregated values set in the index page. The different versions of schema are stored in the code statically and page deserialization needs to refer to the specific schema to decode each aggregated value. After the aggregation values are read out from the index page, they are stored in the page record structure. The new aggregated variables will have already in the page record structure before the upgrade. If the specific aggregated value is not in the index page, a default unknown value will be given.

When the index record is written back to the index page. The respective aggregated values will be serialized to the index page, and the index page format version will be bumped to the latest version. The new aggregated values in the index pages will stay unknown before the real aggregated values are back-filled into the index page, and the incremental update will not apply on the unknown aggregated values.

The initial calculation of the aggregated values needs to read every data page/index page and rewrite every index page in the file table. It recursively reads the target value in every row in the child level page, aggregate them and write the aggregated value to the parent level index page, until a new file table is generated. This process can be part of the file table garbage collection (GC) process. Using the file table GC to do aggregated values calculation can provide benefits as outlined below.

As file table GC regularly rewrites the valid data in the base file table out of the sparse extents, the aggregated value calculation can be finished gradually, even without continuation. If a data page is selected to be rewritten during the file table GC, the aggregated value from this page will be written to the index row, and the aggregated value version is updated to indicate the aggregation value is updated. For a certain index page, only when the version of all the index records inside are up-to-date, the aggregated value can be propagated to the parent level index page. Once all the data pages are rewritten, the aggregated values in each level of index page will be finished. And, once one complete round of extent age based GC is finished, the whole file table will be very compacted and the performance on the file table operations will be improved Aggregated value calculation will not impact the system performance, as long as the file table GC does not impact the system performance by using the age-based rewrite and by controlling the data to be rewrite every time.

Every optimization that can improve the file table GC, such as parallelization/continuation, can also improve such aggregated values calculation.

Every time after the expected aggregated values format version is bumped, another round of age based rewrite is needed in order to fill the new added aggregated values.

Once the aggregated value in the index record is no longer an unknown value, the ongoing file table merge can update the aggregated value on this index record incrementally. As the rewrite/backfill for the new version is ongoing, existing aggregates from older versions of the aggregate values can be queried so that there is no loss of functionality during the merge process.

When a query is sent to the table server, a special file table iterator on the base file table will be formed with the range filter to start aggregated process. The process keeps iterating the aggregated value from the key low to key high and accumulating them. When the process ends, the final aggregation value will be returned to the client. The iterator is special because when the iterator moves to from the starting position to the next page, it goes up to the parent level but will not go down to the child level unless it exceeds the filter range. The iterator will compute the aggregate at runtime. If the iterator meets an unknown aggregated value in an upper-level index page, the iterator will go to a lower-level index page until it finds an aggregated value it can use. As a result, the client does not need to care if all aggregates are filled in or not. The query becomes more efficient as more aggregates are filled in. Staleness can be determined by the difference of the timestamp in the meta page debugging header of the newest delta file table and the base file table.

The aggregated values should be verified routinely in case a software bug or data corruption leads to incorrect aggregated values. Once an aggregated value is found as a mismatch, this aggregated value should be discarded. The verification can be done in the file table GC, but it is just a partial verification. It means that only when the age based rewrite finishes rewriting all the data in the file table, the verification can be complete.

Figure 9:
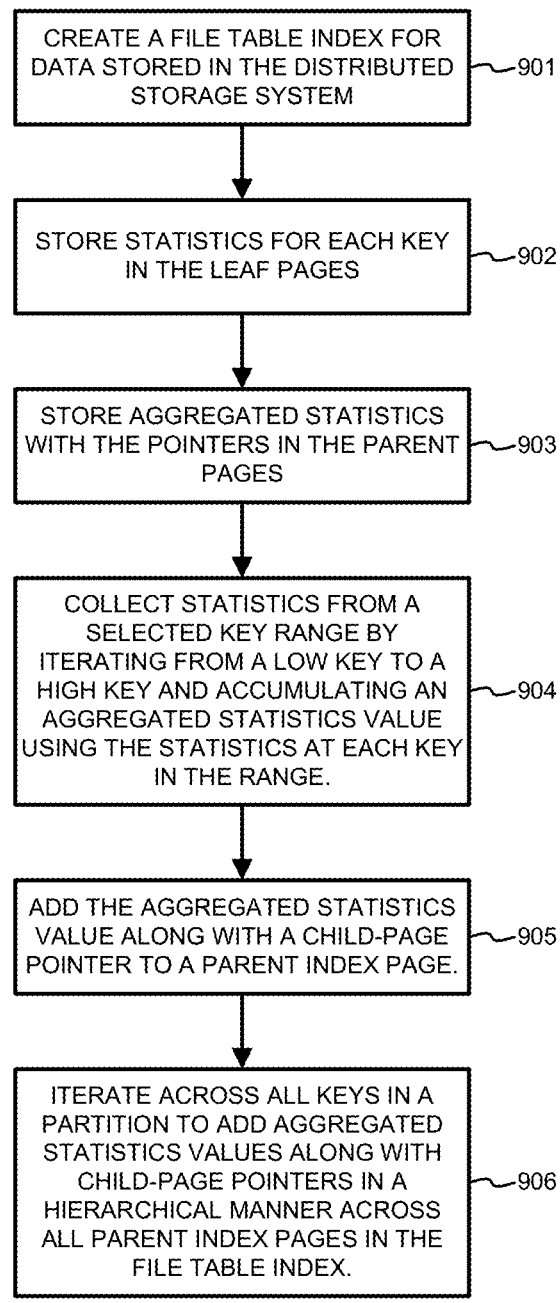
FIG. 9 is a flow chart illustrating a computer-implemented method for aggregating statistics in a distributed storage system according to one embodiment.

FIG. 9 is a flow chart illustrating a computer-implemented method for aggregating statistics in a distributed storage system according to one embodiment. In step 901, a file table index for data stored in the distributed storage system is created. The file table index may comprise a tree structure having leaf pages with data sorted in key order and one or more levels of parent pages above the leaf pages. The parent pages comprise keys and pointers to one or more child pages. In step 902, statistics are stored for each key in the leaf pages. In step 903, aggregated statistics are stored with the pointers in the parent pages. The aggregated statistics in parent pages may be created based upon statistics or aggregated statistics in a child page. The statistics in the leaf pages may correspond to one or more attributes associated with data stored in the leaf pages. Each of the aggregated statistics in a first parent index page may be associated with a group of leaf pages in a key-sequence order.

In step 904, statistics from a selected key range are collected by iterating from a low key to a high key and accumulating an aggregated statistics value using the statistics at each key in the range. In step 905, the aggregated statistics value along with a child-page pointer to a parent index page. In step 906, the process iterates across all keys in a partition to add aggregated statistics values along with child-page pointers in a hierarchical manner across all parent index pages in the file table index.

An example embodiment of a storage system comprises: a stream layer comprising a plurality of storage nodes for storing user data; and a partition layer comprising a plurality of table servers each configured to manage data storage in assigned partitions and to create a file table index for each partition, wherein the file table index comprises a tree structure having leaf pages having data sorted in key order and one or more levels of parent pages above the leaf pages, wherein the parent pages comprise indexing keys and pointers to one or more child pages, and wherein statistics are stored with the leaf page data and aggregated statistics are stored with the pointers in the parent pages.

In another embodiment of the system, the aggregated statistics in parent pages are created based upon statistics or aggregated statistics in a child page.

In another embodiment of the system, the statistics in the leaf pages correspond to one or more attributes of customer data in the leaf pages, and wherein each of the aggregated statistics in a first parent index page are associated with a group of leaf pages in a key-sequence order.

In another embodiment of the system, the table server is configured to collect statistics from a particular key range by iterating from a low key to a high key and accumulating an aggregated value from the statistics at each key in the range.

In another embodiment of the system, the table servers are configured to: store aggregate statistics with one or more child-page pointers in a hierarchical manner across multiple layers of index pages.

In another embodiment of the system, the table servers are configured to: maintain a base file table index for a partition; create a delta file table index for data written to the partition; and merge the delta file table index into the base file table index to create a new file table index.

In another embodiment of the system, a file table garbage collection function is configured to gradually backfill aggregates for existing data.

In another embodiment of the system, querying across a partition to collect statistics is performed at least in part by collecting aggregated statistics from parent index pages without obtaining statistics directly from keys in a key range associated with the parent index page.

In another embodiment of the system, the table servers are configured to: query across a plurality of partitions by aggregating results of individual queries to each of the plurality of partitions.

An example computer-implemented method for aggregating statistics in a distributed storage system comprises creating a file table index for data stored in the distributed storage system, the file table index comprising a tree structure having leaf pages with data sorted in key order and one or more levels of parent pages above the leaf pages, the parent pages comprise keys and pointers to one or more child pages; storing statistics for each key in the leaf pages; storing aggregated statistics with the pointers in the parent pages.

In another embodiment of the method, the aggregated statistics in parent pages are created based upon statistics or aggregated statistics in a child page.

In another embodiment of the method, the statistics in the leaf pages correspond to one or more attributes associated with data stored in the leaf pages, and wherein each of the aggregated statistics in a first parent index page are associated with a group of leaf pages in a key-sequence order.

In another embodiment, the method further comprises collecting statistics from a selected key range by iterating from a low key to a high key and accumulating an aggregated statistics value using the statistics at each key in the range.

In another embodiment, the method further comprises adding the aggregated statistics value along with a child-page pointer in a parent index page.

In another embodiment the method further comprises, iterating across all keys in a partition to add aggregated statistics values along with child-page pointers in a hierarchical manner across all parent index pages in the file table index.

In another embodiment the method further comprises, maintaining a base file table index for a partition; creating a delta file table index for data written to the partition; and merging the delta file table index into the base file table index to create a new file table index, wherein the base file table index generates new leaf pages and new parent index pages and removes old leaf pages and parent index pages.

In another embodiment of the method, the new file table index is created by: creating a new leaf page having keys found in an original leaf page of the base file table index combined in sequence with the keys that were not found in the base file table index; creating a new parent index page having at least a key and a pointer to the new leave page; removing the original leaf page; and removing an original parent page that pointed to the original leaf page.

In another embodiment the method further comprises, backfilling aggregated statistics for existing data using a file table garbage collection function.

In another embodiment the method further comprises, querying across a partition to collect statistics for a key range by collecting at least some aggregated statistics from parent index pages without obtaining statistics directly from customer data in the key range.

In another embodiment the method further comprises, querying across a plurality of partitions by aggregating results of individual queries to each of the plurality of partitions.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A storage system, comprising:
    a processor;
    memory in electronic communication with the processor; and
    instructions stored in the memory, the instructions being executable by the processor to:
        create a file table index for data stored in a distributed storage system, the file table index comprises a tree structure having at least one level of parent pages associated with corresponding ranges of leaf pages, wherein the ranges of leaf pages include statistical data sorted in key order associated with respective ranges of key values, and wherein the parent pages comprise aggregate statistics and keys and pointers to the ranges of leaf pages;
        detect a write to the data stored in the distributed storage system associated with a range of unused key values from the file table index;
        in response to the write to the data stored in the distributed storage system associated with the range of unused key values and prior to updating the file table index to reflect the write associated with the range of unused key values, create a delta file table index including a new parent page and one or more new leaf pages including data stored in key order associated with the range of unused key values indicated by the new parent page, wherein the range of unused key values indicated by the new parent page is a subrange of a first range of key values defined by a first parent page from the of parent pages of the file table index; and
        further in response to the write to the data stored in the distributed storage system, updating the file table index to reflect the write by merging the delta file table index with the file table index by selectively rewriting the first parent page and at least one leaf page corresponding to the first parent page based on the one or more leaf pages from the delta file table.

2. The system of claim 1, wherein the parent pages include aggregated statistics for corresponding ranges of leaf pages created based upon statistics or aggregated statistics in the corresponding ranges of leaf pages.

3. The system of claim 2, wherein statistics in the leaf pages correspond to one or more attributes of customer data in the leaf pages, and wherein the aggregated statistics in the parent pages are associated with a group of leaf pages in a key-sequence order.

4. The system of claim 1, further comprising instructions being executable to: collect statistics from a particular key range by iterating from a low key to a high key within the particular key range and accumulating an aggregated value from the statistics at each key in the range.

5. The system of claim 1, further comprising instructions being executable to:
    store aggregate statistics with one or more child-page pointers in a hierarchical manner across multiple layers of index pages.

6. The system of claim 1, wherein a file table garbage collection function is configured to gradually backfill aggregates for existing data.

7. The system of claim 1, wherein querying across a partition to collect statistics is performed at least in part by collecting aggregated statistics from parent index pages without obtaining statistics directly from keys in a key range associated with the parent index page.

8. The system of claim 1, further comprising instructions being executable to:
    query across a plurality of partitions by aggregating results of individual queries to each of the plurality of partitions.

9. The system of claim 1, wherein merging the delta file table index is with the file table index comprises adding the new parent page and the one or more new leaf pages to the file table index without modifying one or more additional leaf pages associated with the first parent page from the file table index.

10. The system of claim 1, wherein the range of unused key values includes a range of non-allocated key values within the file table index prior to detecting the write to the data stored in the distributed storage system associated with the range of key values.

11. A computer-implemented method for aggregating statistics in a distributed storage system, comprising:
    creating a file table index for data stored in the distributed storage system, the file table index comprising a tree structure having at least one level of parent pages associated with corresponding ranges of leaf pages, wherein the ranges of leaf pages include statistical data sorted in key order associated with respective ranges of key values, and wherein the parent pages comprise aggregate statistics and keys and pointers to the ranges of leaf pages;
    detecting a write to the data stored in the distributed storage system associated with a range of unused key values from the file table index;
    in response to the write to the data stored in the distributed storage system associated with the range of unused key values and prior to updating the file table index to reflect the write associated with the range of unused key values, creating a delta file table index including a new parent page and one or more new leaf pages including data stored in key order associated with the range of unused key values indicated by the new parent page, wherein the range of unused key values indicated by the new parent page is a subrange of a first range of key values defined by a first parent page from the parent pages of the file table index; and
    further in response to the write to the data stored in the distributed storage system, updating the file table index to reflect the write by merging the delta file table index with the file table index by selectively rewriting the first parent page and at least one leaf page corresponding to the first parent page based on the one or more leaf pages from the delta file table.

12. The method of claim 11, wherein the parent pages include aggregated statistics for corresponding ranges of leaf pages created based upon statistics or aggregated statistics in the corresponding ranges of leaf pages, wherein statistics in the leaf pages correspond to one or more attributes associated with data stored in the leaf pages, and wherein the aggregated statistics in the parent pages are associated with a group of leap pages in a key-sequence order.

13. The method of claim 11, further comprising:
collecting statistics from a selected key range by iterating from a low key to a high key and accumulating an aggregated statistics value using the statistics at each key in the range.

14. The method of claim 13, further comprising:
adding the aggregated statistics value along with a child-page pointer to a parent index page.

15. The method of claim 14, further comprising:
iterating across all keys in a partition to add aggregated statistics values along with child-page pointers in a hierarchical manner across all parent index pages in the file table index.

16. The method of claim 11, wherein merging the delta file table index with the file table index comprises:
creating at least one new leaf page having keys found in an original leaf page of the file table index combined in sequence with the keys that were not found in the file table index;
creating a new parent index page having at least a key and a pointer to the new leave page;
removing the original leaf page; and
removing an original parent page that pointed to the original leaf page.

17. The method of claim 11, further comprising:
backfilling aggregated statistics for existing data using a file table garbage collection function.

18. The method of claim 11, further comprising:
querying across a partition to collect statistics for a key range by collecting at least some aggregated statistics from parent index pages without obtaining statistics directly from customer data in the key range.

19. The method of claim 11, further comprising:
querying across a plurality of partitions by aggregating results of individual queries to each of the plurality of partitions.

20. The method of claim 11, wherein merging the delta file table index with the file table index comprises adding the new parent page and the one or more new leaf pages to the file table index without modifying one or more additional leaf pages associated with the first parent page from the file table index.

* * * * *